United States Patent [19]
Li et al.

[11] Patent Number: 5,312,788

[45] Date of Patent: May 17, 1994

[54] HIGH TOUGHNESS, HIGH STRENGTH SINTERED SILICON NITRIDE

[75] Inventors: Chien-Wei Li, Livingston; Jean Yamanis, Morristown, both of N.J.

[73] Assignee: AlliedSignal Inc., Morristown, N.J.

[21] Appl. No.: 76,940

[22] Filed: Jun. 16, 1993

Related U.S. Application Data

[63] Continuation of Ser. No. 716,142, Jun. 17, 1991, abandoned.

[51] Int. Cl.$^5$ ............................................. C04B 35/58
[52] U.S. Cl. ...................................... 501/97; 501/92; 501/98
[58] Field of Search ......................... 501/87, 92, 97, 98

[56] References Cited

U.S. PATENT DOCUMENTS

| | | | |
|---|---|---|---|
| 3,890,250 | 6/1975 | Richerson | 252/516 |
| 4,184,882 | 1/1980 | Lange | . |
| 4,234,343 | 11/1980 | Andersson | . |
| 4,628,039 | 12/1985 | Mizutani et al. | 501/97 |
| 4,795,724 | 1/1989 | Soma et al. | 501/98 |
| 4,800,182 | 1/1989 | Izaki et al. | 501/92 |
| 4,814,301 | 3/1989 | Steinmann et al. | 501/92 |
| 4,870,036 | 9/1989 | Yeh | 501/97 |
| 4,904,624 | 2/1990 | Yeckley | 501/97 |
| 5,026,671 | 6/1991 | Hanzawa et al. | 501/92 X |
| 5,096,859 | 3/1992 | Sakai et al. | 501/97 X |

FOREIGN PATENT DOCUMENTS

| | | |
|---|---|---|
| 0397464 | 11/1990 | European Pat. Off. . |
| 9008113 | 7/1990 | PCT Int'l Appl. . |

OTHER PUBLICATIONS

Ueno & Toibana, "Hot Pressed Silicon Nitride with Various Lanthanide Oxides as Sintering Additives", Yogyo-Kyokai-Shi, vol. 91, (1983), pp. 409–414.

Primary Examiner—Karl Group
Attorney, Agent, or Firm—Ernest D. Buff; Roger H. Criss

[57] ABSTRACT

A silicon nitride sintered body has a composition consisting essentially of 85 to 94% by weight β silicon nitride, 6 to 15% by weight grain boundary phase consisting essentially of (i) at least two rare earth elements, wherein yttrium is considered a rare earth, and, optionally, strontium which, calculated as SrO, is 0–2 percent by weight of the total body, and (ii) at least two of Si, N, O and C, and an additive consisting essentially of a metal-carbon compound present in the amount of about 0.2 to 3.5% by volume. The additive is substantially homogeneously dispersed within the sintered body. The sintered body has a density at least 95% of theoretical and the ceramic has high strength and high toughness and is especially suited for industrial applications such as components for gas turbine and automotive engines. The sintered body has a microstructure wherein (i) the β silicon nitride grains are acicular and have an average grain width ranging from 0.5 to 1.5 μm, (ii) at least 25% of the grains have width greater than 0.7 μm, and at least 10% of the grains have width greater than 1 μm, and (iii) no more than 5% of grains have width greater than 3.5 μm and apparent aspect ratio greater than 5, with the proviso that the average aspect ratio is at least 1.8.

12 Claims, 2 Drawing Sheets

HIGH TOUGHNESS, HIGH STRENGTH SINTERED SILICON NITRIDE

This application is a continuation of application Ser. No. 716,142 filed Jun. 17, 1991, now abandoned.

BACKGROUND OF THE INVENTION

1. Field of the Invention

This invention relates to a dense silicon nitride sintered body. More particularly, this invention relates to a high density silicon nitride material having excellent fracture toughness and excellent strength, and to a method of manufacturing the same.

2. Description of the Prior Art

Sintered silicon nitride ceramics are well-known for their excellent strength at temperature in excess of 1000° C. However, at temperature greater than 1200° C. for the advanced turbine engine applications, few silicon nitride ceramics meet the strength requirement. Furthermore, conventional silicon nitride ceramics have fracture toughness typically ranging from 4 to 6 MPa·m$^{0.5}$, such low toughness makes them susceptible to significant strength degradation from the damage introduced during engine operation. It would be desirable to provide a silicon nitride having both high fracture toughness, hence strong resistance to damage, and high strength both at room and elevated temperature. Moreover, it would be most desirable to have a silicon nitride material with this combination of excellent properties which can easily be formed into near net shape parts of complex geometry.

Sintering silicon nitride requires sintering aids which form grain boundary phases. Rare earth oxides are effective sintering aids and form refractory grain boundary phases yielding silicon nitride ceramics with good high temperature properties. However, they often require high sintering temperature and/or the application of external pressure for complete densification.

Hot pressing generally produces silicon nitride ceramics with excellent strength properties. U.S. Pat. No. 4,234,343 to Anderson discloses that hot-pressed silicon nitride containing different rare earth oxides as sintering aids can have 250 MPa to 550 MPa strength at 1400° C. with smaller rare earth element resulting in higher 1400° C. strength. Ueno and Toibana report in Yogyo-Kyokai-Shi, vol. 91, 409–414 (1983) that hot-pressed silicon nitride containing yttria (Y$_2$O$_3$) in combination with other rare earth oxides exhibits strength of over 600 MPa at 1300° C. Despite these property advantages, it is well known in the field that the process of hot pressing has limited value in the production of structural ceramics because of its shape and size limitations.

Hot isostatic pressing has the same advantages as hot pressing but without the shape and size limitations. U.S. Pat. No. 4,904,624 to Yeckley teaches the fabrication of silicon nitride parts containing rare earth sintering aid with flexural strength in excess of 525 MPa at 1370° C. using glass-encapsulated hot isostatic pressing. However, the fracture toughness of this Si$_3$N$_4$ is only 4 to 5 MPa·m$^{0.5}$. Similarly, U.S. Pat. No. 4,870,036 to Yeh teaches how to fabricate silicon nitride ceramics containing yttria and strontium compound having flexural strength greater than 465 MPa at 1375° C. using hot isostatic pressing, but the fracture toughness of this Si$_3$N$_4$ is 5 to 6 MPa·m$^{0.5}$. Thus, although hot isostatic pressing can produce silicon nitride ceramics with excellent strength, the fracture toughness of such material is low.

Gas pressure sintering is a manufacturing process for silicon nitride employing moderate nitrogen pressure during high temperature firing. It can be used to fabricate refractory silicon nitride parts without shape and size limitations. U.S. Pat. No. 4,628,039 to Mizutani et al. describes using gas pressure sintering to fabricate silicon nitride ceramics having excellent four-point bending strength at 1300° C. Said silicon nitride ceramics contain sintering aids consisting of oxides of two rare earth elements having ionic radii greater and smaller than 0.97 Å respectively, and other minor additives such as oxides of elements from Group IIa of the Periodic Table. U.S. Pat. No. 4,795,724 to Soma et al. describes gas pressure sintered silicon nitride containing at least two kinds of sintering aids selected from Y, Er, Tm, Yb, and Lu having 1400° C. flexural strength of at least 500 MPa; an example given in this patent shows that a gas-pressure-sintered silicon nitride ceramic containing Y$_2$O$_3$ and La$_2$O$_3$ has a strength of only 230 MPa at 1400° C. No information concerning fracture toughness was provided in the above-identified inventions.

It has been reported that silicon nitride containing 10 to 50% by volume silicon carbide, according to U.S. Pat. No. 3,890,250, and up to 40% by volume silicon carbide, according to U.S. Pat. No. 4,184,882, has improved strength at 1400° C.; the ceramics taught by those patentees were prepared by hot pressing and their fracture toughness was not reported. U.S. Pat. No. 4,800,182 to Izaki et al. discloses a hot-pressed silicon nitride/silicon carbide composite, with 5 to 30 wt % of silicon carbide, having three-point bending strength of at least 930 MPa at room n temperature and fracture toughness of 5.3 to 7 MPa m$^{0.5}$ depending on the silicon carbide content. U.S. Pat. No. 4,814,301 to Steinmann and Lip discloses the fabrication of a sintered silicon nitride using crystalline silicates and metal carbides with high retained strength at 1200° C. The strength of those silicon nitride ceramics at 1375° C. will not be high since silicates containing Na, Ca, Mg, Al, and Fe, etc. are used.

SUMMARY OF THE INVENTION

There remains a need in the art for silicon nitride ceramics that are both tough and strong. It is an object for the present invention to provide a silicon nitride ceramic having high strength and high toughness. Such advantageous properties are the direct result of a unique microstructure and composition present in the sintered ceramic body. In particular, the silicon nitride ceramics of this invention evidence fracture toughness greater than 7.5 MPa·m$^{0.5}$ and four-point bending strength greater than 600 MPa at room temperature and greater than 450 MPa at 1375° C. Such ceramics are processed using gas pressure sintering, therefore can be manufactured into complex shapes easily and economically.

According to one aspect of this invention, there is provided a silicon nitride sintered body having a composition and a microstructure consisting essentially of:

(a) 85 to 94% by weight β silicon nitride;

(b) 6 to 15% by weight grain boundary phases consisting essentially of (i) at least two rare earth elements, wherein yttrium is considered a rare earth, and, optionally strontium, which, calculated as SrO, is 0 to 2 percent by weight of the total body, and (ii) at least two of Si, N, O and C; and (c) an additive consisting essentially of a metal carbon compound present in the amount of about 0.2 to 3.5 parts by volume per 100 parts by volume of the components (a) and (b), said additive being substantially homogeneously dispersed within said sintered body, said sintered body having a microstructure wherein (i) said β silicon nitride grains are acicular and have an average grain width ranging from 0.5 to 1.5 μm, (ii) at least 25% of said grains have width greater than 0.7 μm, and at least 10% of said grains have width greater than 1 μm, and (iii) no more than 5% of said grains have width greater than 3.5 μm and apparent aspect ratio greater than 5, with the proviso that the average aspect ratio of all grains is at least 1.8, and having a density at least 95 percent of theoretical. Preferably the metal-carbon compound is a carbide, nitro-carbide or oxynitrocarbide and the metal is at least one of Si, Ti, Hf, Zr, Ta, Mo and V.

According to another aspect of the present invention, there is provided a process for sintering the silicon nitride body which comprises two or more steps wherein (a) at least a first of the steps is carried out at a temperature between 1800 and 2000° C. and for a time ranging from about 1 to 10 hours in order to prepare an intermediate ceramic; (b) at least a succeeding one of the steps is carried out at a temperature ranging from about 2000 to 2100° C. and for a time ranging from about 1 to 10 hours in order to heat treat the intermediate ceramic; (c) each of the steps being carried out under nitrogen pressure sufficiently high to avoid decomposition of silicon nitride, and the temperature of the succeeding steps being at least 25° C. greater than that of the first of the steps.

According to the last aspect of this invention, there is provided a post-sintering heat treatment of this silicon nitride body that preserves its excellent toughness. This treatment can be a crystallization heat treatment during cooling from the sintering temperature or during a reheating step, or it can be an annealing heat treatment for a silicon nitride containing primarily crystalline grain boundary phases. As a result of that treatment, the grain boundary phases are substantially crystalline and are formed or recrystallized by the annealing. Such post-sintering crystallization or annealing is carried out at a temperature greater than 1375° C., and preferably greater than 1450° C.

According to the present invention, there is provided a silicon nitride ceramic body that has fracture toughness greater than 7.5 MPa·m$^{0.5}$ when measured by the Chevron-notch technique described hereinbelow; R-curve behavior and damage resistance properties which are reflected by the ceramic body's indentation strength, as defined hereinbelow, greater than 500, 400, 350, 300, 270 and 220 MPa at indentation loads of 1, 5, 10, 20, 30 and 50 kg, respectively; and a four point flexural strength of at least 600 MPa at room temperature and at least 450 MPa at 1375° C.

Advantageously, the silicon nitride of this invention is fabricated by a gas pressure sintering process which does not have the shape and size limitations of hot pressing, and which does not require the encapsulation and de-encapsulation steps and the high gas pressure of hot isostatic pressing. The combination of excellent properties and ease of fabrication makes the silicon nitride ceramics of the present invention most suitable for industrial applications such as components for gas turbine and automotive engines and as cutting tools.

DESCRIPTION OF THE PREFERRED EMBODIMENTS

Figure 1:
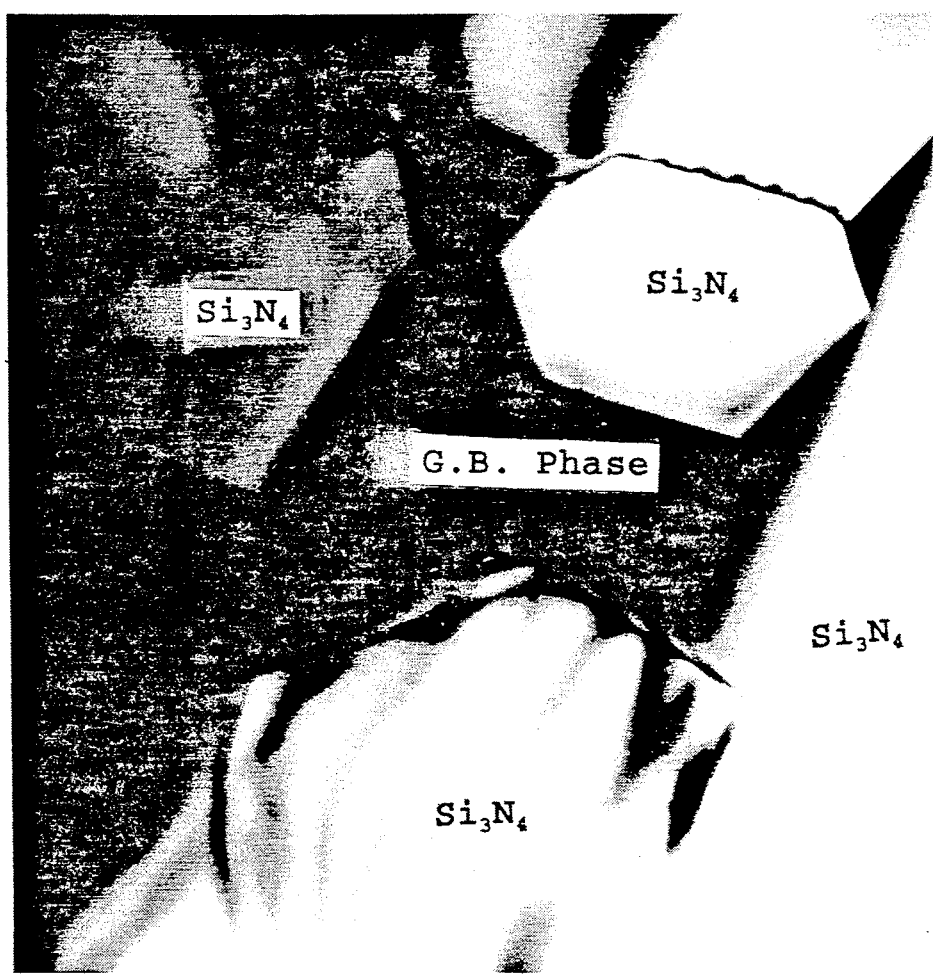
FIG. 1 is a transmission electron micrograph of the grain boundary phase referenced in example No. 11, electron diffraction indicates that the grain boundary phase is primarily glassy.

Three requirements have to be met concurrently to manufacture a high toughness and high strength (room temperature and 1375° C.) silicon nitride ceramic: (1) the grain boundary phase must be refractory so that the 1375° C. strength can be high; (2) the ceramic must be dense and have an optimum microstructure consisting of whisker-like β $Si_3N_4$ grains; and (3) the grain boundary must be relatively weak for sufficient debonding along the grain boundary of the whisker-like β $Si_3N_4$ grain to take place. Details for selecting conditions to manufacture a silicon nitride to meet all these requirements are set forth hereinafter.

In principle, the sintered body of the present invention is formed by sintering a composition comprising (a) silicon nitride, (b) rare earth compounds and optional strontium compound as sintering aids, and (c) metal-carbon compounds. In this composition, component (a) should be present in an amount 85 to 94 percent by weight, and the component (b) should be present in an amount 6 to 15 percent by weight to make up the 100 percent. In addition, component (c) should be present in an amount about 0.2 to 3.5 parts by volume per 100 parts by volume of the components (a) and (b).

The product of this invention should comprise no less than 85 weight percent silicon nitride so that the volume fraction of the grain boundary phases is not too high as excessive grain boundary phase may degrade the fracture toughness and high temperature properties. However, the amount of silicon nitride should be no more than 94 weight percent so that the quantity of liquid phase for sintering is sufficient for densification to proceed to at least 95 percent of theoretical density.

The product of the present invention is fabricated by adding about 6 to 15 percent by weight sintering aids which form grain boundary phases. Sintering aids consisting of $Y_2O_3$, ranging from 1 to 5% by weight, $La_2O_3$ ranging from 3 to 8%, and SrO, ranging from 0 to 2% by weight, may be used for enhancing densification. While said oxides are effective sintering aids and are used in the present invention, it is well known in the field that all rare earth oxides can be effective and refractory sintering aids, and may, therefore, be employed to fabricate the product of this invention. One reason for selecting a composition of at least two rare earth compounds and optional strontium compound is to reduce the liquidus temperature of the system so that densification and microstructure development can be accomplished by processes other than hot-pressing or hot isostatic pressing. The amount of strontium added when calculated as SrO should be no greater than 2% by weight so that the high temperature properties will not be degraded. Another reason for selecting said composition is that the resulting grain boundary phases have good debonding property and yield ceramics with high fracture toughness.

Another requirement in the fabrication of the product of this invention is to add at least one metal-carbon compound in the powder mixture. The amount of metal-carbon compounds should not exceed 3.5% by volume in order to permit sintering to full density, and should be at least 0.2% by volume in order to be effective. The metal-carbon compound used in the fabrication can be crystalline or amorphous. It can be carbide, nitrocarbide or oxycarbonitride. It can also be introduced via a chemical reaction of a carbon bearing species in gas, liquid or solid state with metallic species which eventually forms a metal-carbon compound in the silicon nitride ceramics.

The metal-carbon compound addition improves the strength properties through moderation of the grain growth kinetics during sintering thus resulting in a more uniform and finer microstructure, and through the modification of grain boundary properties. During sintering, two possible reactions occur in the product of this invention owing to the addition of metal-carbon compound. First, the metal-carbon compound can partially dissolve into liquid phase at sintering temperature, and because carbon has strong bonding with other cation elements such as silicon and rare earth in the liquid, the viscosity of the liquid can be increased. Second, excess metal-carbon compound particles at grain boundaries can inhibit grain boundary migration. The combination of these two effects can suppress exaggerated grain growth and result in a more uniform and finer microstructure as compared to the microstructure of a similarly processed silicon nitride which does not contain metal-carbon compound. This more uniform and finer microstructure affords production of ceramic parts having high strength. Incorporating carbon in the grain boundary glassy phase also improves its rigidity and as a result the high temperature strength of the sintered silicon nitride improves. Similar effects of carbon on the properties of oxycarbonitride and oxycarbide glasses have been reported by, for instance, J. Homeny et al, J. Am. Ceram. Soc.,70 [5] C-114 (1987).

According to this invention, a desirable microstructure and grain boundary property yielding high toughness and high strength can be generated by sintering the silicon nitride powder compact of aforedefined compositions by a special process consisting of at least two temperature steps.

The purpose for the first firing step is to prepare an intermediate ceramic of about 70 to 95 percent theoretical density comprising a high density of whisker-like $\beta$ $Si_3N_4$ grains of uniform sizes nucleated and grown in situ through the transportation of atoms via vapor and liquid phases. The formation of this intermediate microstructure is possible since the powder compact initially had high pore volume providing room for $\beta$ $Si_3N_4$ grain to grow along its c axis under the anisotropic surface energy driving force. This incorporation of high density of whisker in the ceramic body can not be achieved by traditional ceramic processing means without problems such as agglomeration and poor green density which translate to sintered parts of poor quality. The firing temperature should be greater than 1800° C. so that the nucleation and growth rates for the whisker-like $\beta$ $Si_3N_4$ grain are adequate. It should be less than 2000° C. because higher temperatures during this step result in exaggerated growth of silicon nitride grains which can eventually lead to a ceramic body of undesirable microstructure. In addition, the firing time should range from about one to 10 hours to allow sufficient amount of whisker-like $\beta$ $Si_3N_4$ grains to develop while controlling grain coarsening so that densification and development of desirable microstructure proceeds.

The intermediate ceramic is then further sintered at a temperature ranging from 2000° C. to 2100° C. for a time ranging from 1 to 10 hours in order to form a final ceramic body reaching at least 95 percent of theoretical density and to further develop the in situ grown, whisker-like $\beta Si_3N_4$ grains. A temperature higher than 2000° C. and at least 25° C. higher than that of the first step is selected in order to complete the densification of the ceramic and to generate a large quantity of whisker-like $\beta$ $Si_3N_4$ grains. The temperature is limited to less than 2100° C. because at temperatures in excess of 2100° C. the process of grain coarsening becomes significant and has undesirable effects on microstructure. The heat treating time should range from 1 to 10 hours so that sufficient densification and grain growth occur for the desirable microstructure to form.

The sintering and heat treating steps are carried out under elevated pressure of nitrogen gas or of a mixture of $N_2$ with one or more inert gases such as Ar or He. Further, in order to prevent excessive decomposition of silicon nitride during the sintering and heat treating steps, it is preferred that the nitrogen pressure is not less than 3.3, 8, 23, 30 and 50 atm at 1800, 1900, 2000, 2050, and 2100° C., respectively.

If the silicon nitride fabricated using the conditions described hereandabove is cooled relatively fast from the sintering temperature so that the liquid phase forms glass (or amorphous phase) between the $Si_3N_4$ grains, its microstructure and grain boundary phase property yield a ceramic body with chevron-notch fracture toughness greater than 7.5 MPa·m$^{0.5}$ and good damage resistance properties. However, if the silicon nitride is slow-cooled or heat-treated after sintering so that it contains primarily crystalline grain boundary phases, the damage resistance properties of said silicon nitride ceramic are found, unexpectedly, to depend strongly on the temperature at which the major crystallization event takes place. If this event takes place either during cooling or in a reheating process at 1375° C. or lower temperatures, the grain boundary property changes and results in significant reduction of damage resistance. On the other hand, if the major crystallization process takes place at temperatures above 1375° C., more preferably above 1450° C., the damage resistance property remains about the same as that of the silicon nitride ceramic without the crystallization heat treatment. Moreover, we have unexpectedly found that for silicon nitride ceramics which have lost some of their damage resistance as a result of grain boundary phase crystallization at 1375° C. or lower temperatures, an annealing process at temperatures greater than 1375° C. can restore the material's fracture toughness.

The following is a brief description of a general procedure for manufacturing the final silicon nitride ceramic of the present invention:

First, a homogeneous mixture of powders is formed by known methods. The mixture is prepared by blending and milling of powders of silicon nitride (85 to 94 wt % and sintering aids (6 to 15 wt % when taken as oxides) consisting primarily of compounds of at least two rare earth elements and optional compound of Sr, and additionally 0.2 to 3.5 volume percent of at least one metal-carbon compound. Said compounds of rare earth elements are preferably oxides, and said metal-carbon compound is preferably a carbide. The powder mixture is then formed into the desired green ceramic body by slip casting, cold isostatic pressing, die forming, or other conventional ceramic manufacturing techniques.

The green ceramic body is then first fired at a temperature from 1800 to 2000° C. for 1 to 10 hours to form an intermediate ceramic body, and then fired at temperatures between 2000 and 2100° C. for 1 to 10 hours to yield a sintered silicon nitride body. These firing steps will be referred to as the sintering and grain growth process. At furnace temperatures above 1800° C. gaseous atmospheres of elevated pressure and having sufficient nitrogen partial pressure to prevent silicon nitride decomposition are used.

After the completion of the sintering and grain growth process, the silicon nitride is cooled relatively fast so that the majority of the grain boundary phase remains amorphous, and then reheated to a temperature above 1375° C. for crystallization of the grain boundary phases. It can also be cooled down from the sintering temperature in a controlled way so that at least 90% of the grain boundary phase crystallizes at temperatures above 1375° C., and more preferably above 1450° C. The grain boundary phase can also be crystallized at temperatures below 1375° C. first, and then annealed at temperatures above 1375° C., and more preferably at temperatures above 1450° C.

Using SEM and image analyzer for microstructural characterization, as will be described hereinbelow, the silicon nitride ceramics of this invention consist of $\beta$-$Si_3N_4$ grains having average width greater than 0.5 $\mu$m but less than 1.5 $\mu$m, and at least 25 percent of the total number of silicon nitride grains having width greater than 0.7 $\mu$m, and at least 10 percent of the silicon nitride grains having width greater than 1 $\mu$m, and less than 5 percent of the grain having width greater than 3.5 $\mu$m and apparent aspect ratio greater than 5, and an average apparent aspect ratio of at least about 1.8.

A sintered silicon nitride body especially preferred in the present invention has fracture toughness greater than 8 MPa·m$^{0.5}$ and indentation-strength greater than 550, 420, 370, 320, 280, and 250 MPa at corresponding 1, 5, 10, 20, 30, and 50 kilogram indentation load respectively, has room temperature strength greater than 700 MPa, and 1375° C. strength greater than 500 MPa. Said silicon nitride sintered body consists of:

(a) 88 to 93% by weight $\beta$ silicon nitride;

(b) 7 to 12% by weight grain boundary phases primarily consisting of (i) at least two rare earth elements, wherein yttrium is considered a rare earth, and Sr ranging from 0 to 1 percent by weight of the total body when calculated as SrO, and (ii) at least two of Si, N, O, and C; and (c) an additive consisting essentially of silicon carbide and/or titanium carbide particulate with an average size less than 2 $\mu$m in the amount ranging from about 0.5 to 1.9 parts by volume per 100 parts by volume of the components (a) and (b), said sintered body having a microstructure wherein (i) said $\beta$ silicon nitride grains are acicular and have an average grain width ranging from 0.6 to 1.2 $\mu$m, (ii) at least 25% of said grains have width greater than 0.8 $\mu$m, and at least 10% of said grains have width greater than 1.1 $\mu$m, and (iii) less than 5 percent of the said grains have width greater than 3 $\mu$m and apparent aspect ratio greater than 5, with the proviso that the average apparent aspect ratio is at least about 1.8, and having a density at least 97 percent of theoretical.

Said preferred silicon nitride is sintered by firing first at temperature between 1850 and 2000° C. under 5 to 40 atmospheres of nitrogen pressure for one to five hours, then ramping to temperature between 2000 and 2050° C. and holding for one to five hours under 30 to 60 atmosphere of nitrogen pressure. During the last hour of firing at temperature between 2000 and 2050° C., the total pressure is increased to a range from 100 to 400 atmosphere by injecting argon gas into the furnace.

The mechanical properties of the silicon nitride ceramic body are readily measured by use of standard tests. In particular, fracture strength measurement is carried out by cutting the material into 3 mm by 4 mm by 50 mm bars, loading the bar on a four-point bend fixture with 20 mm and 40 mm inner and outer spans, and fracturing the bar with test machines using a 5 mm/min. loading rate.

A Chevron-notch method is used for fracture toughness measurement. A Chevron-notched specimen 6.35 mm by 6.35 mm by 25.4 mm is subjected to a three-point bend test using an 38.1 outer span and loading rate 0.0127 mm/min. The said method is adopted in the Advanced Turbine Technology Applications Project of the Department of Energy of the U.S. Government for structural ceramic materials evaluation and selection.

The indentation-strength measurement is carried out by preparing 3 mm by 4 mm by 50 mm bars, diamond polishing the tensile surface down to 1 $\mu$m finish, indenting at the middle of the polished surface with Vickers indenter to generate cracks parallel to the edge of the bar, then fracturing using the procedure described above for strength testing. Since the silicon nitride ceramic body of this invention possesses R-curve behavior, a range of Vickers indentation load preferably between 1 kg to 50 kg should be used to unequivocally characterize this property.

The microstructure and grain size of silicon nitride are characterized using scanning electron microscopy and an image analyzer. The sample is prepared by polishing the surface to be examined down to 1 $\mu$m finish using diamond paste, etching with molten NAOH at 400° C. for 2–6 minutes, and coating the specimen with conducting material like gold. The image analyzer can map out the morphology and dimensions of individual silicon nitride grains. For each specimen at least 3000 grains are measured. The minimum and maximum projections for each grain are defined as the grain width and grain length, respectively. The apparent aspect ratio is calculated by dividing the maximum projection (grain length) by the minimum projection (grain width).

The following examples are presented to provide a more complete understanding of the invention. The specific technique, conditions, materials, proportions and reported data set forth to illustrate the principles and practice of the invention are exemplary and should not be construed as limiting the scope of the invention.

EXAMPLE 1

The starting compositions for silicon nitride ceramics used in this example are shown in Table 1(a). A raw material powder of $Si_3N_4$ with alpha content of 96% and containing less than 100 ppm of metallic impurities such as Fe, Al, Ca, Na, or K and 1 percent by weight of oxygen and having an average grain size of 0.6 $\mu$m and a specific surface area of ~13 m$^2$/g was used. Yttrium oxide ($Y_2O_3$) and lanthanum oxide ($La_2O_3$) with purity of more than 99% by weight and average grain size less than 10 micrometers were used in the proportions as shown in Table 1(a).

TABLE 1(a)

| Sample No. | Si$_3$N$_4$ (wt %) | Y$_2$O$_3$ (wt %) | La$_2$O$_3$ (wt %) | SrO (wt %) | M—C Compound (volume %) |
|---|---|---|---|---|---|
| 1* | 92 | 1.8 | 5.4 | 0.8 | — |
| 2* | 92.2 | 1.8 | 5.6 | 0.4 | — |
| 3* | 90 | 2 | 6 | 2 | — |
| 4* | 90 | 2 | 6 | 2 | — |
| 5* | 92 | 1.8 | 5.4 | 0.8 | 4 SiC |
| 6* | 88 | 2.5 | 7.5 | 2 | 4 SiC |
| 7* | 92 | 1.8 | 5.4 | 0.8 | 6 SiC |
| 8* | 92 | 1.8 | 5.4 | 0.8 | 0.5 SiC |
| 9* | 92 | 1.5 | 4.5 | 2 | 1 SiC |
| 10 | 92 | 1.8 | 5.4 | 0.8 | 0.5 SiC |
| 11 | 92 | 1.8 | 5.4 | 0.8 | 1 SiC |
| 12 | 92 | 2 | 6 | 0 | 1 SiC |
| 13 | 90 | 2 | 6 | 2 | 1 SiC |
| 14 | 91.2 | 4.7 | 3.3 | 0.8 | 1 SiC |
| 15 | 92 | 2.7 | 3.9 | 1.4 | 1.5 SiC |
| 16 | 92 | 1.7 | 4.9 | 1.4 | 1.5 SiC |
| 17 | 92 | 1.7 | 4.9 | 1.4 | 1.5 SiC |
| 18 | 92 | 1.8 | 5.4 | 0.8 | 0.5 HfC |
| 19 | 92 | 1.8 | 5.4 | 0.8 | 0.3 HfC |
| 20 | 92 | 1.8 | 6.4 | 0.8 | 0.7 TiC |
| 21 | 92 | 1.8 | 5.4 | 0.8 | 0.7 TiC |
| 22 | 92 | 1.8 | 5.4 | 0.8 | 0.3 TaC |

Strontium carbonate (99% pure, 1 μm average size) was used as the precursor for strontium oxide (SrO): one hundred parts by weight strontium carbonate yield 70 parts by weight SrO. Appropriate amounts of strontium carbonate were used to yield strontium oxide with the weight percentages shown in Table 1(a). The quantity of metal carbide (99% pure, average size ranging from 0.2 μm to 5 μm) shown in Table 1(a) was calculated as a percentage of the total volume. For each compound, its amount in volume is equal to its amount in weight divided by its density. The densities for pure Si$_3$N$_4$, Y$_2$O$_3$, La$_2$O$_3$, SrO, SiC, TiC, HfC, and TaC compounds are 3.2, 5.0, 6.5, 4.7, 3.2, 4.9, 12.2, and 13.9 g/cm$^3$, respectively.

The formulated mixture weighing 350 g was wet-milled for 24 hours in a one liter high density polyethylene bottle with 500 mL isopropanol and with 2 kg silicon nitride grinding media. The milled slurry was vacuum dried, and the resulting powder sieved through a 60 mesh nylon screen. The sieved powder was isostatically pressed at a pressure 200–300 MPa to obtain green compacts of approximately 25 mm by 25 mm by 60 mm. The green compacts were fired under the conditions shown in Table 1(b). The properties measured for these samples are shown in Table 1(c).

TABLE 1(b)

| Sample No. | Temperature 1 (°C.) | Time 1 (hr) | Max. Pressure 1 (atm) | Temperature 2 (°C.) | Time 2 (hr) | Max Pressure 2 (atm) |
|---|---|---|---|---|---|---|
| 1* | 1975 | 3 | 20 | — | — | — |
| 2* | 1975 | 3 | 21 | 2000 | 2.5 | 100 |
| 3* | 1950 | 4 | 17 | 2050 | 4 | 80 |
| 4* | 1700 | 2 | 2000 | — | — | — |
| 5* | 1975 | 3 | 20 | 2025 | 3 | 30 |
| 6* | 1975 | 3 | 20 | 2025 | 3 | 100 |
| 7* | 1975 | 3 | 20 | 2025 | 3 | 100 |
| 8* | 1975 | 3 | — | — | — | — |
| 9* | 1975 | 1.5 | 20 | — | — | — |
| 10 | 1858 | 4 | 20 | 2025 | 4 | 80 |
| 11 | 1975 | 3 | 20 | 2025 | 3 | 100 |
| 12 | 1975 | 3 | 20 | 2025 | 3 | 100 |
| 13 | 1975 | 3 | 20 | 2010 | 3 | 100 |
| 14 | 1850 | 4 | 10 | 2025 | 3 | 100 |
| 15 | 1975 | 3 | 20 | 2025 | 3 | 100 |
| 16 | 1950 | 4 | 10 | 2025 | 3 | 100 |
| 17 | 1975 | 3 | 10 | 2025 | 3 | 100 |
| 18 | 1975 | 2 | 20 | 2050 | 2 | 100 |
| 19 | 1975 | 3 | 20 | 2025 | 3 | 100 |
| 20 | 1975 | 3 | 20 | 2025 | 3 | 100 |
| 21 | 1950 | 6 | 15 | 2050 | 2 | 200 |
| 22 | 1975 | 3 | 20 | 2050 | 2 | 400 |

Note:
*green billets glass-encapsulated and hot-isostatically pressed.

TABLE 1(c)

| Sample No. | Relative Density (%) | Strength at 25° C. (MPa) | Strength at 1375° C. (MPa) | Fracture Toughness (MPa · m$^{0.5}$) |
|---|---|---|---|---|
| 1* | 88 | — | — | — |
| 2* | 100 | 630 | 412 | 9.0 ± 0.2 |
| 3* | 98.9 | 590 | 372 | 11.6 ± 0.7 |
| 4* | 100 | 965 | 532 | 5.6 |
| 5* | 93 | — | — | — |
| 6* | 98.7 | 847 | 449 | 7.1 ± 0.1 |
| 7* | 85 | — | — | — |
| 8* | 93.7 | — | — | — |
| 9* | 82 | — | — | — |
| 10 | 99.3 | 748 | 486 | 9.0 ± 0.3 |
| 11 | 99.4 | 777 | 515 | 8.7 ± 0.1 |
| 12 | 100 | 759 | 519 | 8.6 ± 0.1 |
| 13 | 100 | 789 | 488 | 8.4 ± 0.1 |
| 14 | 99.4 | 757 | 450 | 7.8 ± 0.1 |
| 15 | 98.4 | 736 | 450 | 8.1 |
| 16 | 100 | 816 | 473 | 8.2 ± 0.2 |
| 17 | 100 | 821 | 459 | 8.1 ± 0.3 |
| 18 | 100 | 658 | 456 | 9.0 |
| 19 | 100 | 708 | 495 | 9.2 ± 0.1 |
| 20 | 98.2 | 731 | 490 | 8.5 ± 0.1 |
| 21 | 100 | 723 | 511 | 9.3 |
| 22 | 100 | 654 | 479 | 8.6 ± 0.1 |

Note:
*outside the scope of the present invention

Sample Nos. 1 to 9 either have 1375° C. strength lower than 450 MPa, or fracture toughness less than 7.5 MPa·m$^{0.5}$, or density less than 95 percent of theoretical. Notice that sample Nos. 1 to 4 did not contain metal-carbide compound and sample Nos. 1, 4, 8, and 9 were fired using conditions outside the specification of this invention. Sample Nos. 1, 8 and demonstrate that sintering at 1975° C. only cannot achieve densification greater than 95 percent of theoretical density and hence the properties of the ceramic are expected to be poor. Sample Nos. 2 and 3 demonstrate that the strength of the ceramic in the absence of carbide addition is generally low although the fracture toughness is high. Sample No. 4 shows that sintering by glass-encapsulation hot-isostatic pressing yields silicon nitride ceramics with excellent strength but poor fracture toughness. Sample Nos. 5 and 7 did not densify to greater than 95 percent theoretical density because the silicon carbide content was excessive and the materials could not be gas pressure sintered. Note that sample No. 6 is sintered using the same schedule as sample No. 5, and has the same amount (4% by volume) of carbide additive, but is able to reach density greater than 95% of theoretical because the amount of sintering aids is 4% by weight more. Notice that its strength and fracture toughness are slightly below that of the present invention.

In contrast, it is seen that samples Nos. 10 through 22 simultaneously have high density, fracture toughness above 7.5 MPa·m$^{0.5}$, room temperature strength greater than 600 MPa, and 1375° C. strength greater than 450

MPa. These samples are silicon nitride sintered bodies consisting of 85 to 94 percent by weight silicon nitride grains. The balance to 100 percent is grain boundary phases, primarily consisting of at least two rare earth elements and minor Sr in the amount 0 to 2 weight percent when calculated as SrO, and other elements like Si, N, O, C, and impurities. In addition, these samples contain less than 3.5 but greater than 0.2 volume percent of carbides. The sintered bodies are prepared using a schedule comprising two steps of which the first one is carried out at temperatures between 1800 and 2000° C. and for a time from 2 to 6 hours and the second step is carried out at temperatures ranging from 2010° C. to 2050° C. and for a time between 2 and 4 hours.

In Table 2, indentation-strength data for sample Nos. 4, 6, 11, 14 and 20 of Table 1 are compared.

TABLE 2

| Sample No. | Strength (MPa) after Indentation at indicated Load | | | | | |
|---|---|---|---|---|---|---|
| | 1 Kg | 5 Kg | 10 Kg | 20 Kg | 30 Kg | 50 Kg |
| 4* | 493 | 336 | 259 | 221 | 197 | 188 |
| 6* | 665 | 418 | 333 | 290 | 264 | 220 |
| 11 | 623 | 453 | 398 | 352 | 330 | 283 |
| 14 | 614 | 420 | 376 | 315 | 283 | 232 |
| 20 | 648 | 453 | 389 | 363 | 301 | 285 |

Note:
*outside the scope of the present invention

At a Vickers indentation load of 1, 5, 10, 20, 30, and 50 kg, respectively, the indentation or residual strengths of sample No. 4 are the lowest, reflecting the low fracture toughness of this hot-isostatically-pressed silicon nitride. The indentation strength of sample No. 6, which has a Chevron-notch fracture toughness of 7.1 MPa·m$^{0.5}$, at indentation load greater than 5 kg are all lower than the corresponding strengths for sample Nos. 11, 14, and 20. This demonstrates the R-curve and damage resistance property of the product of this invention.

Figure 2:
FIG. 2 is a transmission electron micrograph of heat-treated sample No. 11 showing $Si_3N_4$ grains, crystalline grain boundary phases, and a SiC particle.

After the sintering, the cooling rate for all samples in Table 1 was ~80° C./min. from ~2000° C. to 1600° C., and ~40° C./min. from 1600° C. to 1000° C. This cooling schedule generates sintered silicon nitride comprising primarily amorphous grain boundary phase. FIG. 1 is a Transmission Electron Microscope (TEM) micrograph of sample No. 11 showing the grain boundary phase remains amorphous. FIG. 2 is the TEM micrograph of sample No. 11 heat-treated at 1300° C. in nitrogen for 5 hours showing a SiC particle adjacent to Si$_3$N$_4$ grains and crystalline grain boundary phases.

EXAMPLE 2

In the same manner as described in Example 1, cold isostatically pressed bodies were prepared by using compositions shown in Table 3(a), sintered using the conditions shown in Table 3(b). The properties of the sintered silicon nitride are listed in Table 3(c). In Table 3(d), the microstructural features including average grain width, grain width at 75, 90, 95, and 99 percent cumulative frequency, average aspect ratio, and aspect ratio at 95 percent cumulative frequency are listed.

TABLE 3(a)

| Sample No. | Si$_3$N$_4$ (wt %) | Y$_2$O$_3$ (wt %) | La$_2$O$_3$ (wt %) | SrO (wt %) | M—C Compound (volume %) |
|---|---|---|---|---|---|
| 23* | 92 | 1.8 | 5.4 | 0.8 | — |
| 24* | 90 | 2 | 6 | 2 | — |
| 25 | 92 | 1.8 | 5.4 | 0.8 | 0.5 SiC |
| 26 | 92 | 1.8 | 5.4 | 0.8 | 1 SiC |
| 27 | 92 | 1.5 | 4.5 | 2 | 1 SiC |
| 28 | 92 | 1.8 | 5.4 | 0.8 | 2 SiC |

TABLE 3(b)

| Sample No. | Temperature 1 (°C.) | Time 1 (hr) | Max. Pressure 1 (atm) | Temperature 2 (°C.) | Time 2 (hr) | Max. Pressure 2 (atm) |
|---|---|---|---|---|---|---|
| 23* | 1960 | 4 | 20 | 2050 | 2 | 80 |
| 24* | 1960 | 4 | 60 | 2050 | 3 | 80 |
| 25 | 1975 | 3.5 | 20 | 2025 | 3 | 100 |
| 26 | 1975 | 3 | 20 | 2025 | 3 | 100 |
| 27 | 1975 | 3 | 20 | 2025 | 3 | 100 |
| 28 | 1975 | 3.5 | 20 | 2025 | 3 | 100 |

TABLE 3(c)

| Sample No. | Relative Density (%) | Strength at 25° C. (MPa) | Strength at 1375° C. (MPa) | Fracture Toughness (MPa·m$^{0.5}$) |
|---|---|---|---|---|
| 23* | 100 | 620 | 345 | 10.0 ± 0.3 |
| 24* | 100 | 667 | 355 | 8.9 ± 0.5 |
| 25 | 99.5 | 661 | 511 | 8.7 ± 0.1 |
| 26 | 100 | 802 | 578 | 8.5 ± 0.1 |
| 27 | 99 | 781 | 498 | 8.5 ± 0.3 |
| 28 | 99.5 | 866 | 494 | 7.9 ± 0.2 |

TABLE 3(d)

| Sample No | Cumulative Grain Width (μm) Distribution | | | | | Aspect Ratio Distribution | |
|---|---|---|---|---|---|---|---|
| | Average | 75% | 90% | 95% | 99% | Average | 95% |
| 23* | 1.4 | 1.7 | 2.5 | 3.3 | 5.4 | 2.0 | 3.8 |
| 24* | 1.0 | 1.2 | 1.7 | 2.0 | 3.1 | 2.1 | 4.0 |
| 25 | 0.8 | 1.0 | 1.3 | 1.6 | 2.3 | 2.0 | 3.6 |
| 26 | 0.8 | 1.0 | 1.4 | 1.8 | 2.7 | 1.9 | 3.5 |
| 27 | 0.7 | 0.9 | 1.2 | 1.5 | 2.1 | 2.0 | 3.7 |
| 28 | 0.7 | 0.8 | 1.1 | 1.3 | 2.0 | 2.0 | 3.8 |

Note
*outside the scope of this invention

From Table 3(c), we see that sample No. 23 has the highest fracture toughness but lowest room temperature strength, while sample No. 28 has the lowest fracture toughness but highest room temperature strength. From Table 3(d), we see that sample No. 23 has the coarsest while sample No. 28 has the finest microstructure. This microstructure and mechanical properties correlation can be understood in terms of R-curve behavior of the material. Moreover, sample No. 23 has a room temperature strength (620 MPa) close to the lowest strength (600 MPa) for product of this invention, whereas sample No. 28 has a fracture toughness (7.9±0.2 MPa·m$^{0.5}$) close to the lowest fracture toughness (7.5 MPa·m$^{0.5}$) for product of this invention.

Thus, from data shown in Table 3 (a) to (d), it can be seen that sintered silicon nitride ceramics with fracture toughness greater than 7.5 MPa·m$^{0.5}$ and room temperature and 1375° C. strengths greater than 600 and 450 MPa, respectively, have average grain width greater than 0.5 μm but less than 1.5 μm, and at least 25 percent of the total number of silicon nitride grains having width greater than 0.7 μm, and at least 10 percent of the silicon nitride grains having width greater than 1 μm, and less than ·5 percent of the grains having width greater than 3.5 μm and apparent aspect ratio greater than 5, and an average apparent aspect ratio of at least about 1.8, and have grain boundary phases primarily consisting of at least two rare earth elements and minor Sr in the amount of 0 to 2 weight percent when calculated as SrO and other elements such as Si, N, O, and C, and 0.2 to less than 3.5 volume percent of metal-carbon compounds.

EXAMPLE 3

Sample Nos. 11, 19, 20, 22, 27 and 28 of Tables 1 and 3 were heat treated at Various temperatures to crystallize the grain boundary phase, or/and crystallized first at a lower temperature and then further annealed or recrystallized at a higher temperature. The heat-treatment conditions and the indentation strength after the heat treatment are listed in Table 4.

TABLE 4

| Sample No. | Crystallization Temperature | Strength (MPa) after indentation at indicated load | |
|---|---|---|---|
| | | 1 kg | 10 kg |
| 11a* | 1300° C. | 388 | 228 |
| 11b | 1450° C. | 504 | — |
| 11c | 1500° C. | 604 | — |
| 19* | 1300° C. | — | 158 |
| 20* | 1300° C. | 284 | — |
| 22 | 1550° C. | 634 | — |
| 27a* | 1300° C. | 525 | 310 |
| 27b | 1300° C. + 1385° C. | 731 | — |
| 28a* | 1300° C. | 299 | 285 |
| 28b | 1300° C. + 1500° C. | 590 | 385 |
| 28c* | 1050° C. + 1300° C. | 482 | 325 |
| 28d | 1050° C. + 1385° C. | 578 | 396 |
| 28e | 1050° C. + 1420° C. | 667 | 387 |
| 28f | 1450° C. | 552 | — |
| 28g | 1500° C. | 583 | — |
| 28h | 1550° C. | 623 | 375 |

Note
*outside the scope of the present invention

We can see that sample Nos. 11a, 19, 20, 27a, 28a, and 28c which were crystallized at 1300° C. lost a significant fraction of their damage resistance property as indicated by the low indentation strength, whereas a further annealing at temperatures not lower than 1375° C. (sample Nos. 27b and 28b) leads to recovery of the damage resistance property, i.e. high indentation strength. Furthermore, all samples crystallized at temperatures greater than 1375° C. have indentation strengths similar to that of the samples containing primarily amorphous grain boundary phase.

What is claimed is:

1. A silicon nitride sintered body having a composition consisting essentially of:
   (a) 85 to 94% by weight β silicon nitride;
   (b) 6 to 15% by weight grain boundary phases consisting essentially of (i) at least two rare earth elements, wherein yttrium is considered a rare earth, (ii) strontium which, calculated as SrO, is present up to 2 percent by weight of the total body, and (iii) at least two of Si, N, O and C; and
   (c) an additive consisting essentially of a metal-carbon compound present in the amount of about 0.2 to 3.5% by volume, said additive being substantially homogeneously dispersed within said sintered body, said sintered body having a microstructure wherein (i) said β silicon nitride grains are acicular and have an average grain width ranging from 0.5 to 1.5 μm, (ii) at least 25% of said grains have width greater than 0.7 μm, and at least 10% of said grains have width greater than 1 μm, and (iii) no more than 5% of said grains have width greater than 3.5 μm and apparent aspect ratio greater than 5, with the proviso that the average aspect ratio of all grains is at least 1.8, and having a density at least 95% of theoretical.

2. A silicon nitride sintered body as recited by claim 1, wherein said metal carbon compound is a carbide, nitro-carbide or oxynitro-carbide and said metal is one of Si, Ti, Hf, Zr, Ta, and V.

3. A silicon nitride sintered body as recited by claim 2, wherein said metal carbon compound is selected from the group consisting of silicon carbide, titanium carbide, hafnium carbide and tantalum carbide.

4. A silicon nitride sintered body as recited by claim 1, having a chevron-notch fracture toughness greater than 7.5 MPa·m$^{0.5}$ and indentation strengths greater than 500, 400, 350, 300, 270, and 220 MPa at indentation loads of 1, 5, 10, 20, 30 and 50 kg, respectively.

5. A silicon nitride sintered body as recited by claim 1, having a 4-pt flexural strength of at least 600 MPa at room temperature and at least 450 MPa at 1375° C.

6. A silicon nitride sintered body as recited by claim 1 having yttrium and lanthanum as rare earth elements in the grain boundary phases with yttrium, calculated as $Y_2O_3$, ranging from 1 to 5 wt % and lanthanum, calculated as $La_2O_3$, ranging from 3 to 8 wt %.

7. A silicon nitride sintered body as recited by claim 1, said body having been sintered by a process having at least two steps, wherein:
   (a) at least a first of said steps if carried out at a temperature between 1800 and 2000° C. and for a time ranging from about 1 to 10 hrs. in order to prepare an intermediate ceramic;
   (b) at least a succeeding one of said steps is carried out at a temperature ranging form about 2000 to 2100° C. and for a time ranging from about 1 to 10 hrs. in order to heat treat the intermediate ceramic;
   (c) each of said steps being carried out under nitrogen pressure sufficiently high to avoid decomposition of silicon nitride, and the temperature of said succeeding steps being at least 25° C. greater than that of said first of said steps.

8. A silicon nitride sintered body as recited by claim 1, wherein said grain boundary phases are substantially crystalline and are formed or recrystallized by annealing at temperatures of at least 1375° C.

9. A silicon nitride sintered body as recited by claim 1, having a chevron-notch fracture roughness greater than 8 MPa·m$^{0.5}$ and 4-pt flexural strength of at least 700 MPa at room temperature and at least 500 MPa at 1375° C.

10. A silicon nitride sintered body as recited by claim 9, wherein said average grain width ranges from 0.6 to 1.2 μm, at least 25% of the grains having width greater than 0.8 μm, at least 10% of the grains having width greater than 1.1 μm, less than 5% of the grains having width greater than 3 and an apparent aspect ratio greater than 5, with the proviso that the average aspect ratio is at least 1.8.

11. A silicon nitride sintered body as recited by claim 1, having a chevron-notch fracture toughness greater than 9 MPa·m$^{0.5}$ and 4-pt flexural strength of at least 600 MPa at room temperature and at least 450 MPa at 1375° C.

12. A silicon nitride sintered body as recited by claim 11, wherein said average grain width ranges from 0.8 to 1.5 μm, at least 25% of the grains having width greater than 1 μm, at least 10% of the grains having width greater than 1.2 μm and less than 5% of the grains having width greater than 3.5 μm and apparent aspect ratio greater than 5, with the proviso that the average aspect ratio is at least 1.8.

* * * * *